No. 674,326. Patented May 14, 1901.
S. W. WARDWELL.
COUNTERSHAFT.
(Application filed Oct. 26, 1900.)
(No Model.) 2 Sheets—Sheet 1.
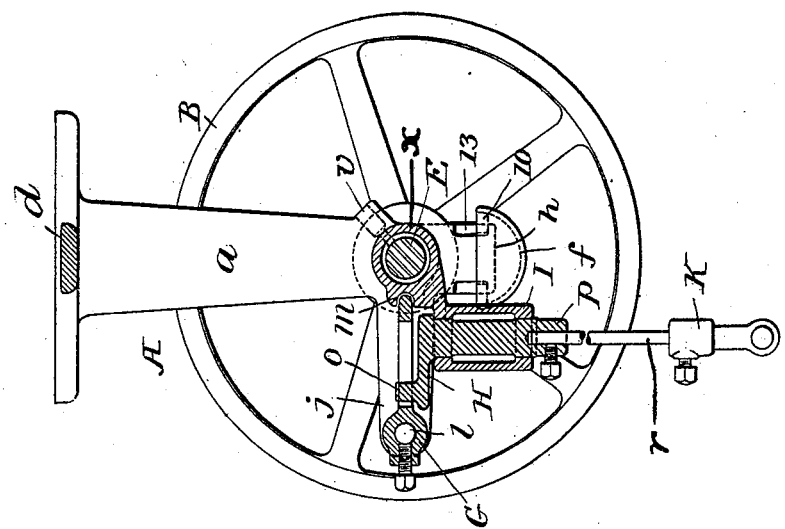
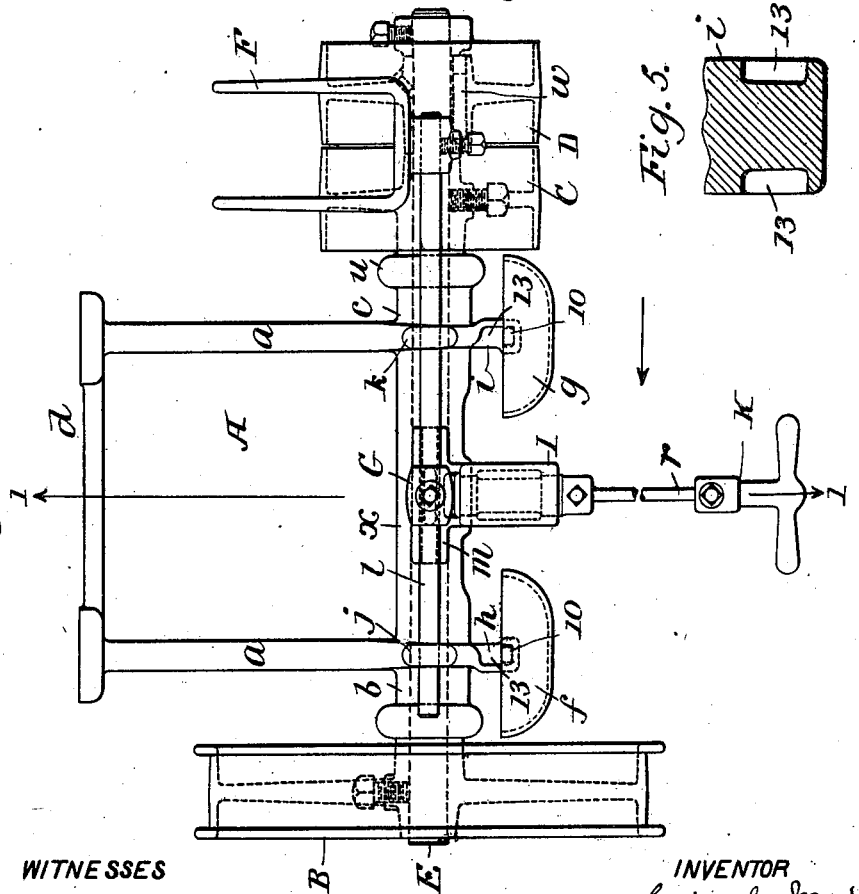
WITNESSES
INVENTOR
BY
ATTORNEYS

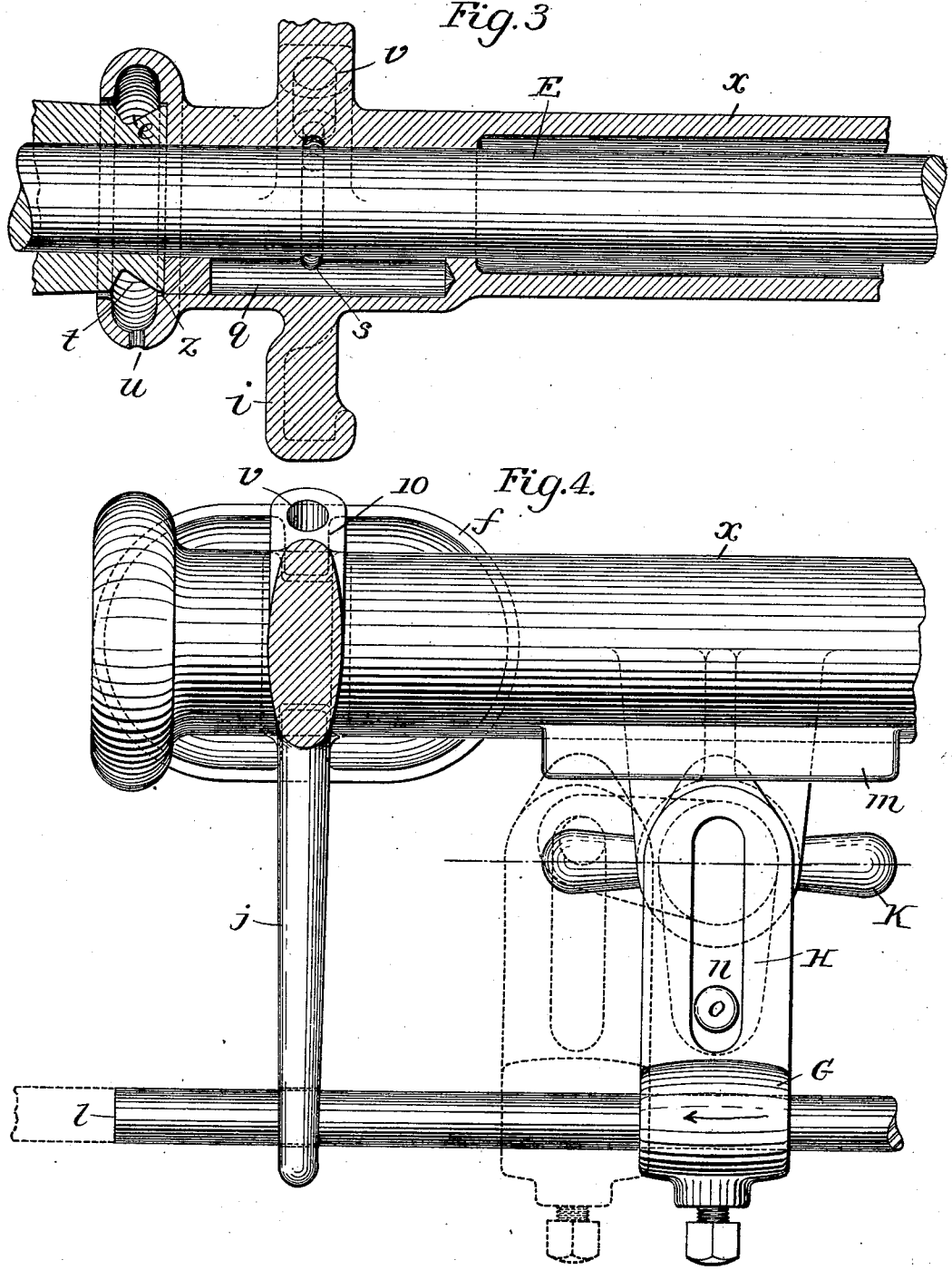

UNITED STATES PATENT OFFICE.

SIMON W. WARDWELL, OF PROVIDENCE, RHODE ISLAND.

COUNTER-SHAFT.

SPECIFICATION forming part of Letters Patent No. 674,326, dated May 14, 1901.

Application filed October 26, 1900. Serial No. 34,468. (No model.)

*To all whom it may concern:*

Be it known that I, SIMON W. WARDWELL, a citizen of the United States, residing at Providence, in the county of Providence and State of Rhode Island, have invented certain new and useful Improvements in Counter-Shafts, of which the following is a specification.

My invention relates to improvements in counter-shafts, and particularly to that class of appliances in which a belt is shifted from a loose to a tight pulley, or vice versa, to start or stop the machinery which is operated from said counter-shaft.

The object of my invention is to make a structure which is self-contained, being free from joints and connections and simple in construction.

The accompanying drawings illustrate the distinctive features of my new structure.

Figure 1 shows a front view of the counter-shaft, its hanger, and attachments; Fig. 2, a vertical section on the line 1 1 looking in the direction of the arrow, Fig. 1; Fig. 3, a vertical section of part of the hanger and counter-shaft; Fig. 4, a plan view of one end of the hanger and adjacent parts with the supporting-arm removed; Fig. 5, a cross-section of one of the lugs which support the drip-cups.

An essential feature of my counter-shaft is a hanger A, comprising in one piece the base or foot $d$, arms $a$ $a$, dependent therefrom, a tubular cross member $x$, connecting the extremities of the dependent arms, lateral arms $j$ and $k$, a box I, and projections with L-shaped recesses 13 to support oil-drip cups. A shaft E extends through the member $x$, and on the shaft are the driving-pulley B, from which the machinery to be driven is belted, and tight and loose pulleys C D to receive the belt that connects the counter-shaft with the line-shaft or other source of power, and on the hanger are supported all the devices for shifting the counter-shaft-driving belt from the loose to the tight pulley to start or, vice versa, to stop the rotation of the shaft. The pulleys are arranged, preferably, as shown, the tight pulley C close to the bearing of the hanger, so that the least possible stress shall be brought upon the shaft E while power is transmitted through the counter-shaft. The loose pulley D is located at the extremity of the shaft and against the tight pulley C.

The usual shipper-fork F is provided to control the position of the belt, and said fork is attached to a rod $l$, that slides longitudinally in bearings at the extremities of the arms $j$ and $k$.

Attached fixedly to the rod $l$ between the arms $j$ and $k$ is a slotted arm G, having its extremity fitted to slide on a longitudinal bearing, which is formed by a guideway $m$ in one side of the member $x$ of the hanger A. The arm G is moved to shift the rod $l$, and with it the shipper-fork F, by a crank H, the vertical shaft of which is supported to turn in the box I. To minimize the amount of machining required, the mid portion or chamber of the box I is greater in diameter than the openings in the ends, and the corresponding portion of the crank-shaft P is likewise of reduced diameter, so that but small sections of each are in bearing contact and need to be machined, though sufficient bearing area is provided to withstand all normal wear.

The crank-pin $o$ is integral with the crank and engages the slot of the arm G to shift the latter when the crank is turned. The slot in the arm G is so related in length to the pin $o$ that the latter can travel through an arc of more than one hundred and eighty degrees, or a little greater than a semicircle, thus at each extreme of its throw passing the point commonly denominated the "dead-center."

As indicated by the dotted lines in Fig. 4, when the pin $o$ is moved to the extremity of its travel any pressure against the arm G in the direction indicated by the arrow serves but to press the pin tighter into the end of its slot. Such pressure is liable to be exerted by the belt while running; but it will be seen that the means described practically constitute a lock, preventing any improper movement.

To the lower end of the crank-shaft $p$ is attached a rod $r$, through which the crank H is turned by means of the handle K on the rod.

The crank-shaft $p$ is held in its bearings and restrained from displacement therefrom by the arm G, which in turn is restrained from movement, except longitudinally, by the guideway $m$, into which its end extends. The arm G is held fast to the rod $l$, thus preventing the latter from turning, and thereby rocking the fork F out of engagement with the belt.

The bearings for the shaft E are formed in the tube or sleeve constituting the bottom member $x$ of the hanger A, there being just below each bearing an oil-chamber $q$, to be filled with an absorbent to maintain the lubrication. Lubricant is introduced through the hole $v$, which is suitably enlarged at its outer portion to readily admit the nose of an oil-can. To distribute the oil, an annular groove $s$ in the internal surface of the bearing connects the oil-hole $v$ with the channel $q$.

By forming the two bearings in the tubular member $x$ I not only protect their adjacent ends from dirt and grit, that must inevitably collect were the bearings in separated bosses or boxes, but any excess of lubricant that might work through the bearings and drip from the ends of the bosses or boxes is in this structure retained. At the outer ends the member $x$ is expanded to form enlargements with internal annular recesses $u$, which surround the annular faces $e$ of recesses $t$ in the hubs of the adjacent pulleys. The object of this arrangement is to prevent any oil which might work to the outer ends of the bearings from collecting on the pulleys and working outward away from the hanger, and thus being thrown from the rapidly-rotating parts to spatter and deface surrounding objects.

The hubs of pulleys and wheels of cast metal are customarily made to taper from the middle to the ends, so that the pattern may be readily drawn from the sand in the process of molding.

The natural tendency of the oil as it works from the ends of the bearings adjacent to the pulleys as such bearings are usually constructed is to flow radially from the shaft, due principally to centrifugal action, and the oil on reaching the edge of the hub, partly because of its natural adhesion to the surface of the hub, partly because of capillary affinity for the fine dust and lint that inevitably collects on such surfaces, and partly by action of centrifugal force, works away from the end of the hub toward that portion which is of the largest diameter until a point is reached either on the pulley-hub or the arms where, owing to the high speed of rotation, it is thrown off. The construction indicated prevents this action, as the oil coming from the end of the bearing in the hanger can go no farther on the bearing than the point $z$, Fig. 3, for after passing that it cannot work down into the recess $t$ in the hub of the pulley against the action of the centrifugal force, but simply flows to and is thrown outward on the face $e$ and collects on the periphery at said portion $z$ and finally drops or is thrown into the annular recess $u$. Thence it drips into the pendent drip-cups below.

The hubs of the pulleys closely fit the openings in the ends of the member $x$ to reduce opportunity for dirt and grit to work into the bearings. To insure thorough lubrication, the loose pulley is provided with an absorbent-holding chamber $w$, similar to that in the hanger-bearings.

Each drip-cup is provided near the top with internal lugs 10, adapted to fit correspondingly L-shaped recesses 13 in the lugs $h$ and $i$, cast to the bottom of the hanger A, so that a cup may be connected with the hanger by passing its lugs into the horizontal parts of the recesses and then carrying them downward into the vertical parts. This arrangement prevents the cups from working loose and avoids the necessity of using keys, pins, or screws for securing the cups and affords no opportunity for the oil to find its way from within the cups, so as to drip therefrom. The cups can readily be removed, but only by lifting them and then moving them longitudinally, thus preventing their displacement through accident.

In counter-shaft structures heretofore employed the belt-shifting devices comprise numerous parts secured in place and connected by several screws and frequently supported from the hanger by separate pieces attached thereto. In my improved structure a minimum number of parts is employed in the belt-shifting mechanism, all bearings and supporting members being cast integral with the hanger, and but one screw is required to secure the members of the belt-shifting mechanism in position. Further, the recessed lugs $h$ and $i$, which constitute supports for the detachable drip-cups $f$ and $g$, are also cast integral with the hanger, thus obviating the employment of screws, pins, or other devices.

Without limiting myself to the precise constructions and arrangements of parts shown and described, I claim as my invention—

1. The combination with a one-piece hanger, comprising laterally-extending arms and a guideway on the hanger, of a shifting-rod running through the arms, a slotted arm attached to the rod, and supported by the guideway, and a crank-shaft provided with a crank having a pin extending into the slot of said arm, the said crank-shaft turning in bearings in a box, also cast integral with the hanger.

2. The combination of a hanger having, in one piece, a dependent cross member containing shaft-bearings and a longitudinal guideway, and arms extending from the hanger, with a shifting-rod sliding in said arms, a slotted arm connected to said shifting-rod, and extending to said guideway, a box also integral with the hanger, and a crank-shaft extending through the box, and provided with a crank having a pin engaging with the slotted arm.

3. The combination in a counter-shaft, of a belt-shifting rod, a slotted arm attached to the rod, a crank to shift the rod having a crank-pin fitting the slot in said arm, a hanger comprising in one piece, lateral arms to support and guide the shifting-rod, a guideway to receive and guide the slotted arm and prevent it from turning with the rod, and a dependent box having bearings for the crank.

4. The combination in a counter-shaft with a shaft, tight and loose belt-pulleys mounted on the shaft, and belt-shifting devices comprising a shifting-rod, a slotted arm attached to the rod, and a crank engaging with the slotted arm to shift the rod, of a hanger comprising in one piece a base, bearings for the shaft dependent from the base, a tubular cross member between the bearings and surrounding the shaft, having a guideway to support and guide the slotted arm, and bearings for the crank-shaft.

5. The combination in a counter-shaft, of a hanger comprising in a single piece the bearings for the shaft and for a belt-shifting rod, with a belt-shifting rod, a slotted arm on said rod, a crank held in place in its bearings by said slotted arm with which it engages, the opposite end of the slotted arm supported by guiding devices which are integral with the hanger.

6. The combination in a counter-shaft, of a hanger comprising in a single piece the bearings for the shaft and the belt-shifting devices and hooks to support the oil-drip cups, oil-drip cups appropriately formed to fit and hang from the said hooks, a belt-shifting rod, a slotted arm on the said rod, a crank having a shaft held in place in its bearings by said slotted rod and with which the crank engages and whose extremity is supported and guided in a guideway that is integral with the hanger, and a single screw whereby said shifting-rod, slotted arm and crank are secured in their bearings, substantially as set forth.

7. A counter-shaft hanger comprising in one piece a foot or base, dependent bearings for a shaft, a tubular member to inclose the shaft between the bearings, a guideway on the side of said tubular member, lateral arms to support and guide belt-shifting devices, a bearing to support a crank or equivalent device whereby the belt-shifting devices are operated, and hooks to support detachable drip-cups.

8. The combination with the hanger A having arms $j$ $k$, a box I and a horizontal guideway $m$ all integral, of a shifting-rod supported by said arms, a slotted arm extending from said rod and supported by the guideway, a crank-shaft provided with a crank having a pin extending into the slot of said slotted arm, the said crank-shaft turning in bearings in said box to carry the pin beyond the dead-center.

In testimony whereof I have signed my name to this specification in the presence of two subscribing witnesses.

SIMON W. WARDWELL.

Witnesses:
L. G. SHERMAN,
CHARLES E. FOSTER.